Figure 1:
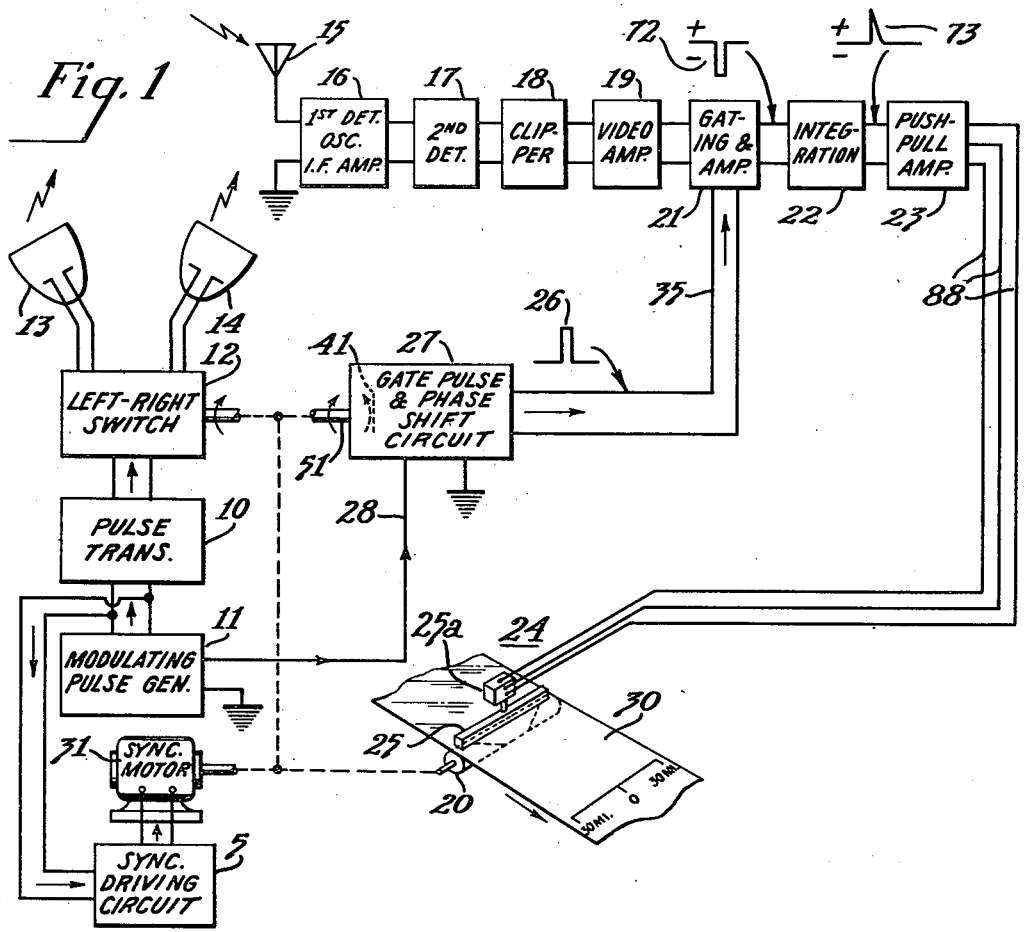

Oct. 9, 1951  J. P. SMITH  2,570,500
RADAR SYSTEM WITH GATING AND SYNCHRONIZED RECORDER
Filed Nov. 29, 1945  6 Sheets—Sheet 1

INVENTOR
John P. Smith
BY
ATTORNEY

Oct. 9, 1951        J. P. SMITH        2,570,500

RADAR SYSTEM WITH GATING AND SYNCHRONIZED RECORDER

Filed Nov. 29, 1945        6 Sheets-Sheet 2

INVENTOR
John P. Smith
BY
ATTORNEY

NOTE: GATING PULSE IS MOVED THROUGH THE FULL RANGE (i.e. FROM 0 μ.s. TO 222 μ.s.) IN 0.176 SECOND.

Oct. 9, 1951  J. P. SMITH  2,570,500
RADAR SYSTEM WITH GATING AND SYNCHRONIZED RECORDER
Filed Nov. 29, 1945  6 Sheets-Sheet 4

INVENTOR
John P. Smith
BY
ATTORNEY

Patented Oct. 9, 1951

2,570,500

UNITED STATES PATENT OFFICE 2,570,500

RADAR SYSTEM WITH GATING AND SYNCHRONIZED RECORDER

John P. Smith, Cranbury, N. J., assignor to Radio Corporation of America, a corporation of Delaware Application November 29, 1945, Serial No. 631,722

8 Claims. (Cl. 343—13)

My invention relates to radar systems and particularly to systems wherein the reflected signals are recorded by a facsimile recorder or the like.

In my copending application Serial No. 589,924, filed April 23, 1945 and entitled Radar System, now Patent No. 2,492,120 issued December 20, 1949, there is described a radar system wherein, for example, a gating pulse is applied to the amplifier of a pulse-echo receiver and is shifted along a time axis in synchronism with the scanning of a recorder which may be of the carbon paper type. Thus the presence and the locations of reflecting objects may be recorded.

It has been found that sometimes the system described in said application fails to record the presence of an object such as an aircraft or ship, for example, because of momentary fading of the reflected signal. Such fading is usually caused by multiple path reflections.

The possibility of such failure to record an object may be greatly reduced by increasing the scanning speed of the recorder. However, if this is the only change that is made in the equipment, the resulting recordings will have irregular or ragged edges so that the recordings will be difficult to interpret, particularly since there is usually a substantial amount of noise recorded. In many cases a recording made by an aircraft, for example, cannot be distinguished from the recorded background noise if said recording is a blurred or irregular line instead of a clean cut line.

Accordingly, an object of the invention is to provide an improved method of and means for recording the information supplied by a radar system.

A further object of the invention is to provide an improved method of and means for minimizing the effects of fading in a radar system of the type wherein the radar information is recorded.

According to one preferred embodiment of the invention the radar system is of the pulse-echo type wherein a gating pulse is applied to an amplifier in the radar receiver and wherein the gating pulse is shifted along the time axis. A recorder, which may be of the carbon paper type, is driven so that it scans comparatively rapidly in synchronism with the timing or phase shift of the gating pulse. The scanning rate is made fast enough to minimize the possibility of missing a signal that is present only for a short interval before it fades away. In order to avoid a ragged or irregular recording, means is provided to make the recorder scanning synchronous with the transmission of the radar pulses.

Figure 2:
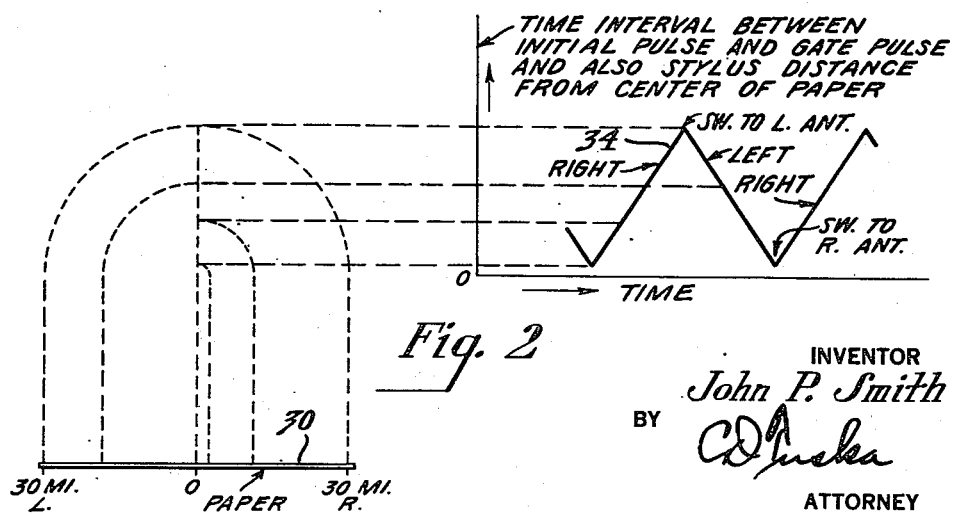
Figure 3:
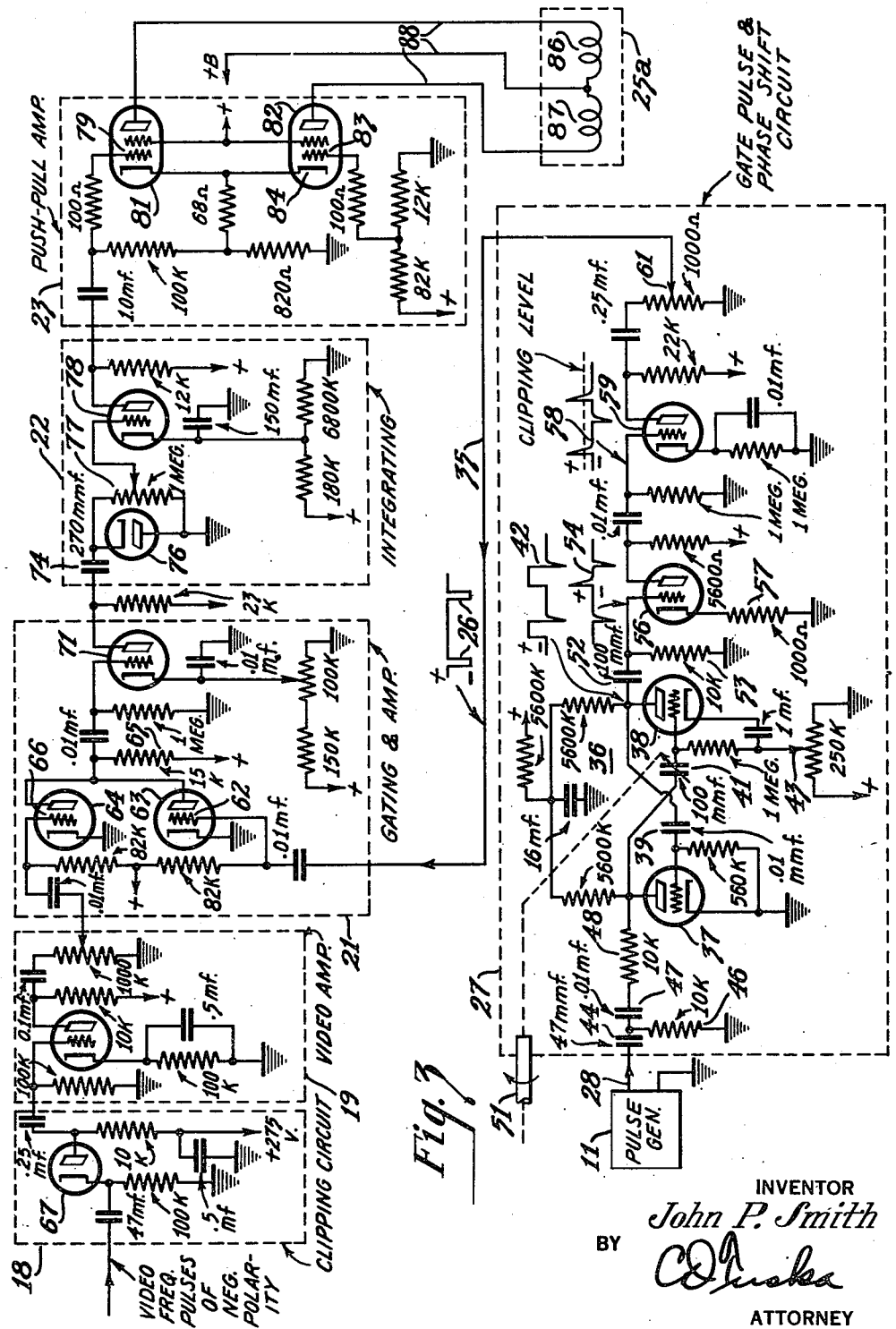
Figure 4:
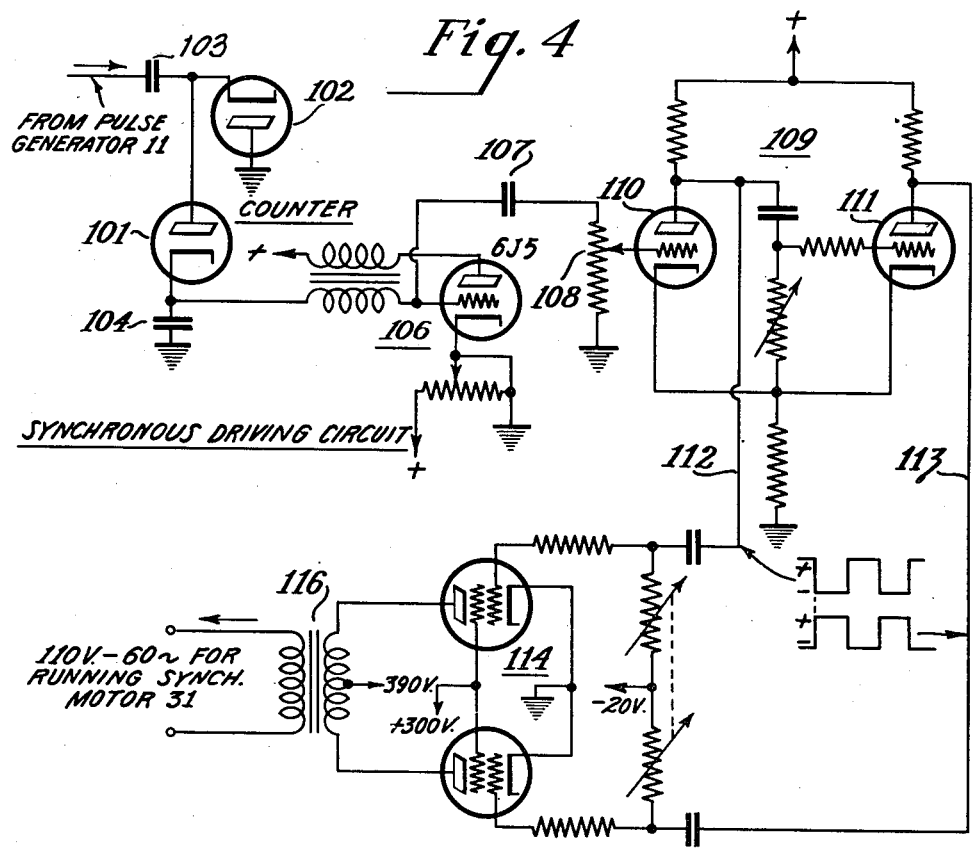
Figure 5:
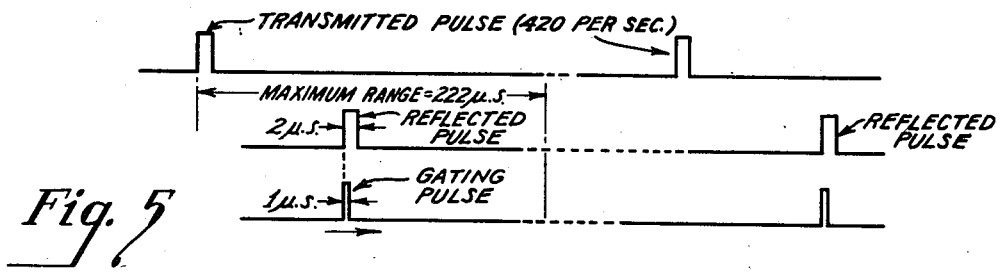
Figure 6:
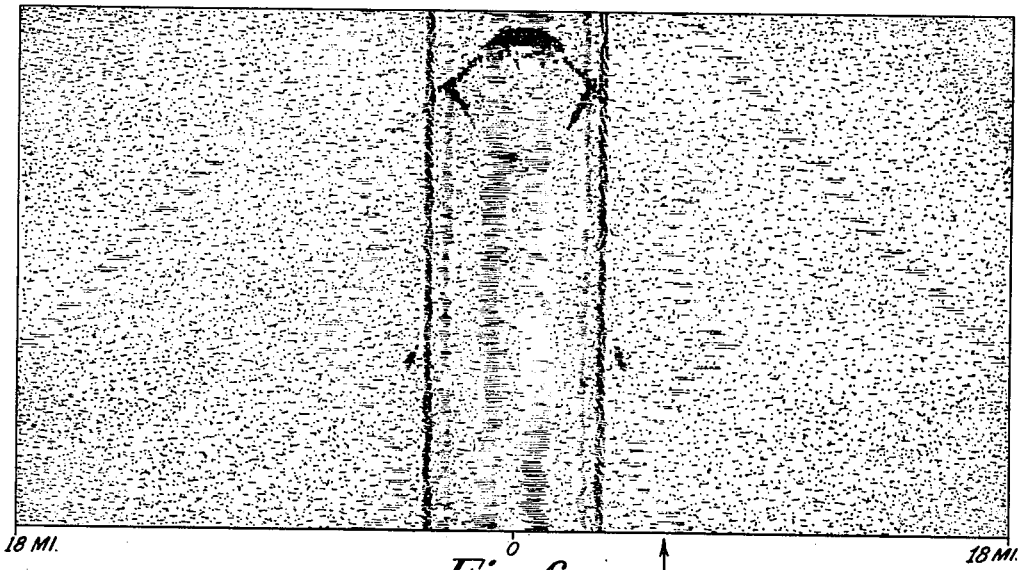
Figure 7:
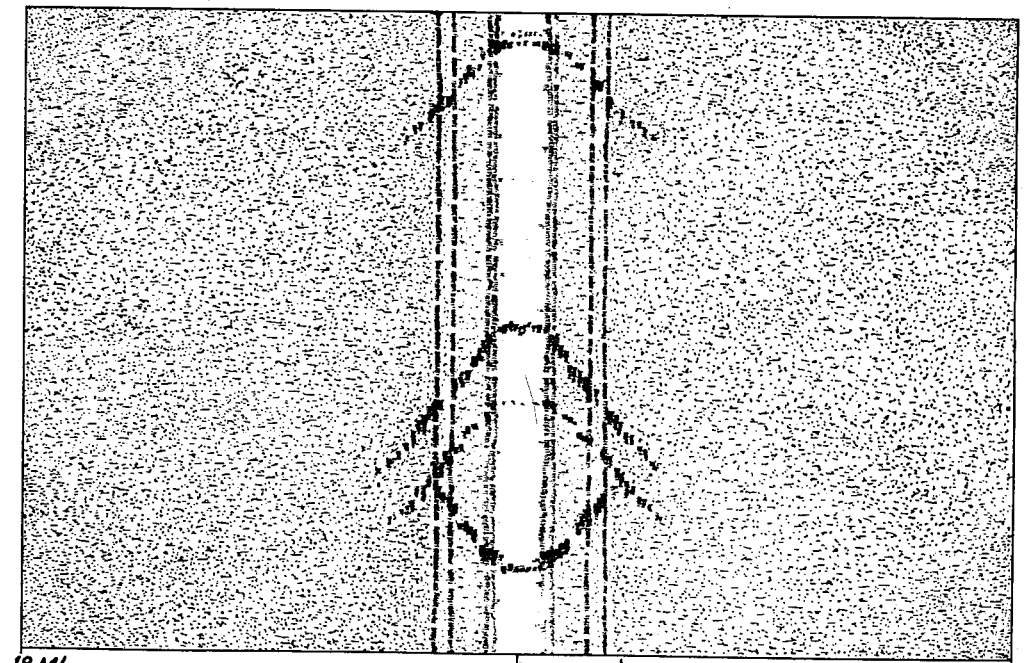
Figure 8:
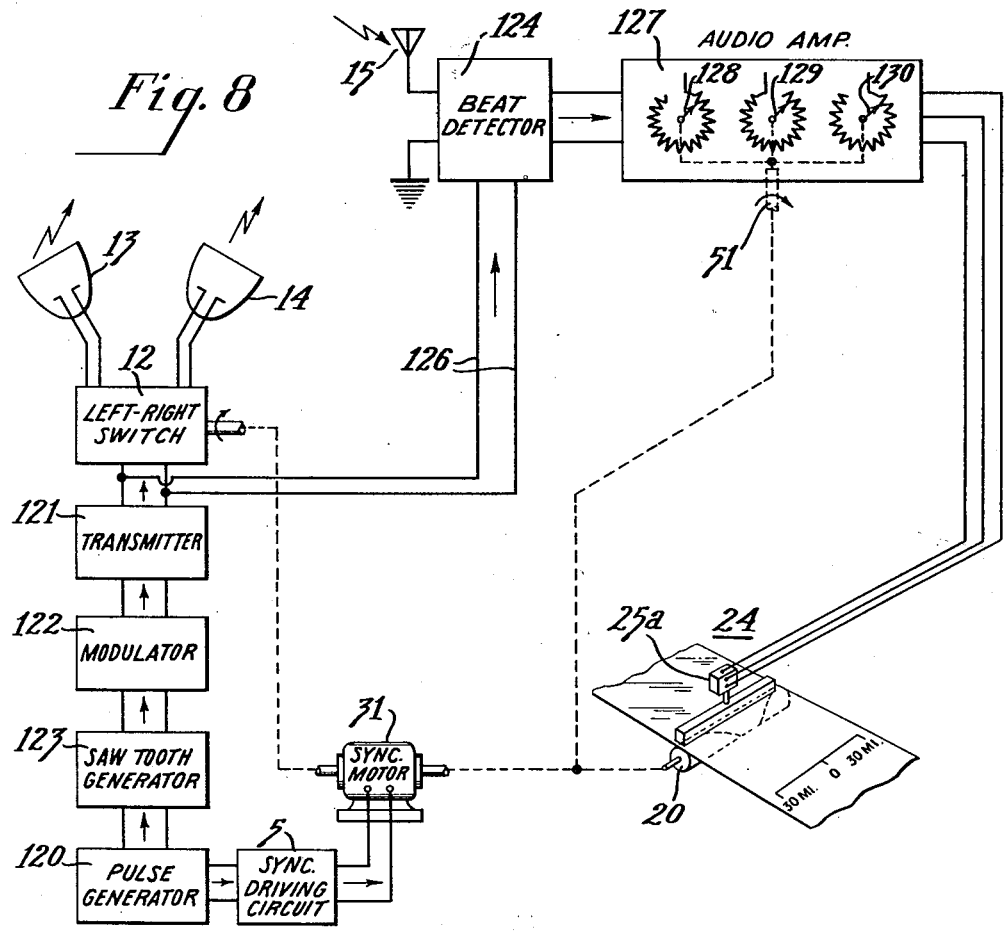
Figure 9:
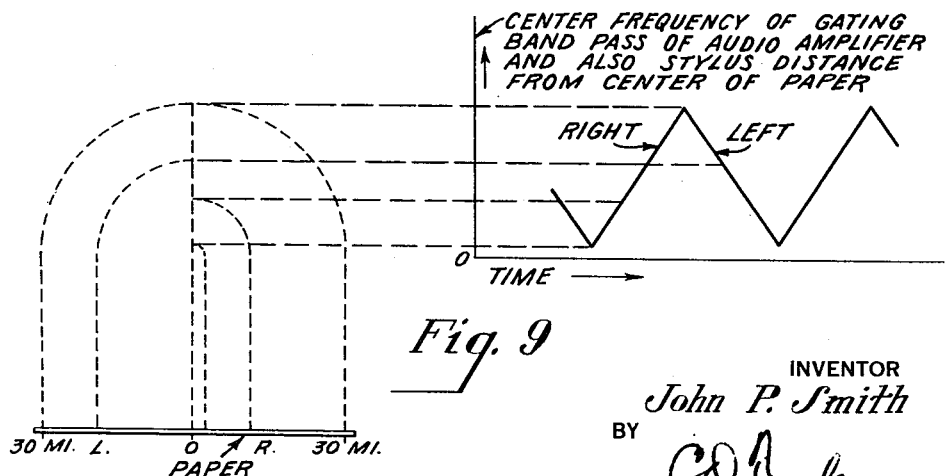
Figure 10:
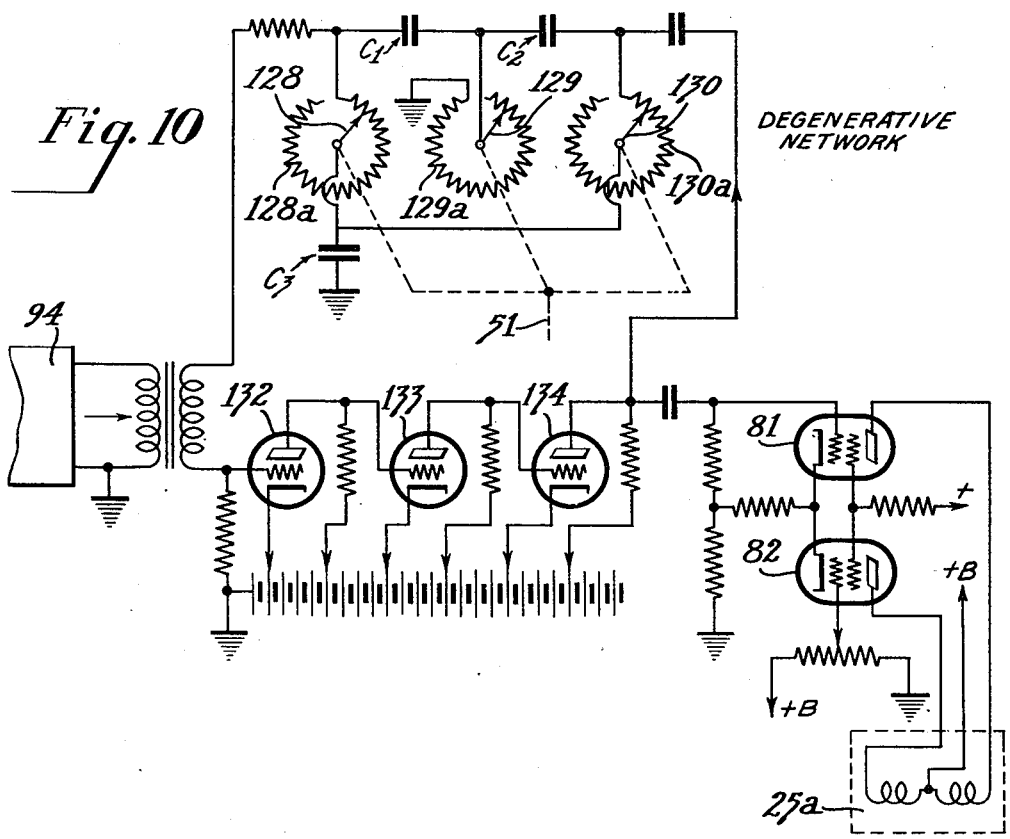
Figure 11:
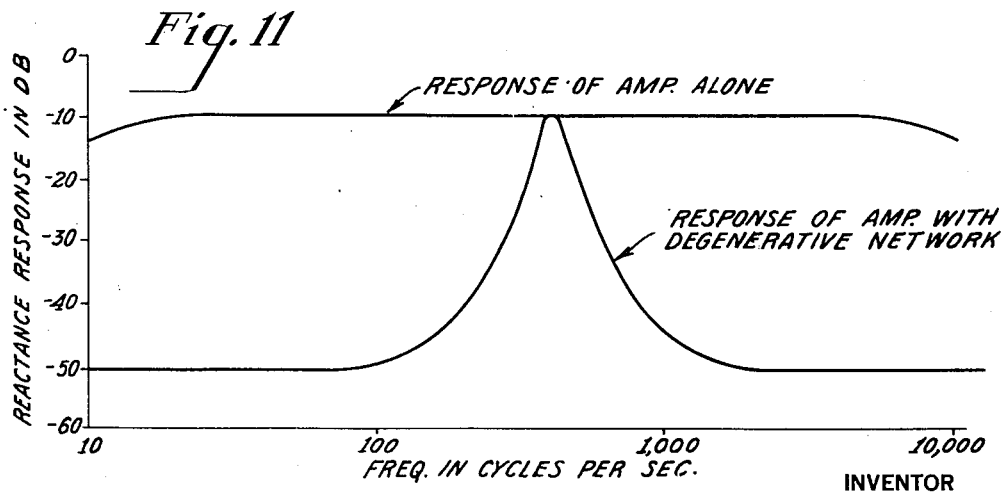

The invention will be better understood from the following description taken in connection with the accompanying drawing in which Figure 1 is a block diagram showing the invention as applied to a pulse-echo radar system, Figure 2 is a group of graphs that are referred to in explaining the operation of the circuit shown in Fig. 1, Figure 3 is a circuit diagram of a portion of the system shown in Fig. 1, Figure 4 is a circuit diagram of a portion of the system shown in Fig. 1, Figure 5 is another group of graphs that are referred to in explaining the operation of the system shown in Fig. 1, Figure 6 is a reproduction of a recording that was obtained without the use of the present invention, Figure 7 is a reproduction of a recording that was obtained by the use of the present invention, Figure 8 is a block diagram of an embodiment of the invention as applied to a frequency-modulated radar system, Figure 9 is a group of graphs that are referred to in explaining the operation of the system shown in Fig. 8, Figure 10 is a circuit diagram of the audio frequency amplifier shown in Fig. 8, and Figure 11 is a graph showing the frequency-response characteristic of the amplifier shown in Fig. 10.

In the several figures, similar parts are indicated by similar reference characters.

Referring to Fig. 1, the invention is applied to a pulse-echo system comprising a radio pulse transmitter 10 that is modulated by periodic electrical pulses supplied from a pulse generator 11. The radio pulses are supplied through suitable switching means, such as a left-right switch 12, alternately to directive antennas 13 and 14. The radiation patterns of the antennas 13 and 14 may be directed forwardly and to the left and right as illustrated, or they may be directed to left and right in exactly opposite directions, for example.

After reflection from a target or other reflecting surface, the radio pulses are picked up by a receiving antenna 15 and supplied to a receiver which may be of the superheterodyne type comprising a first detector, a tunable oscillator and an I.-F. amplifier indicated at 16, a second detector 17, and a video frequency amplifier 19. A clipping circuit 18 preferably precedes the amplifier 19. The receiving apparatus further comprises a gating circuit and an amplifier indicated at 21, an integration circuit 22, a push-pull amplifier 23 and a recorder 24. The recorder may be of the well known carbon paper type having a scanning drum 20 carrying a helix indicated by dotted line and a printer bar 25 between which the recording paper 30 is fed. In order to simplify the drawing the carbon paper is not shown. The printer bar 25 is actuated by a driving mechanism 25a. A recorder of this type is described in Re. 20,152 reissued October 27, 1936, in the name of C. J. Young.

The gating circuit 21 has a gating pulse 26 applied thereto from a gate pulse and phase shift circuit 27. The gating pulse 26 is synchronized with the transmitted pulse by a connection 28 which supplies pulses from the generator 11 to the gate pulse circuit 27. The timing of the pulse 26 with respect to the transmitted pulse is shifted in synchronism with the stylus or scanning drum movement of the recorder 24 by means of a motor 31 which rotates a capacitor 41 in the gate pulse circuit and which also drives the scanning drum 20 of the recorder 24. The motor 31 also operates the antenna switch 12 in a predetermined time relation with respect to the phasing of the gate pulse and the scanning of the recorder.

In accordance with the present invention the motor 31 is a synchronous motor which is driven in synchronism with the radar transmitter pulses by means of a driving circuit 5. In this way the scanning drum 20 is rotated synchronously with the radio pulses radiated from the antennas 13 and 14. The circuit 5 is illustrated in Fig. 4 and will be described in detail hereinafter.

Fig. 2 illustrates the sequence of operation and the timing relations of the various units in Fig. 1. The graph 34 shows that when the right antenna 14 is first switched to the transmitter 10, the time interval between the transmitted pulse and the gate pulse 26 is a minimum, and the distance of the recorder stylus or contact point from the center of the recording paper 30 is also a minimum. During the period that the right antenna 14 is radiated signal the gate pulse 26 is shifted in timing or phase to increase said time interval to a maximum at the end of the "right" switching period, and at the same time the recorder contact point from the center of the paper 30 to the right edge of the paper.

Next the left antenna 13 is switched to the transmitter 10 and the gate pulse 26 is now shifted in timing toward the transmitted pulse thus gradually decreasing said time interval to its mimimum value, and at the same time the recorder contact point is moved from the left edge of the paper 30 to the center of the paper. The cycle of operation is now repeated.

Since a reflected signal can pass through the gating circuit 21 only during the time a gating pulse 26 is being applied thereto, a mark will be recorded on the paper 30 at a point on either the right or left distance scale corresponding to the distance to the target, the mark being either to the right or to the left of zero or center on the paper depending upon whether the target is to the right or to left. In Fig. 2, the broken projection lines show how a mark is made on the paper 30 by reflected pulses occurring at different times and being passed to the recorder by the gating pulse 26.

As explained hereinafter, the width or duration of the gating pulse 26 and the scanning speed of the recorder preferably are such as to allow only one or two reflected pulses from a particular target to pass through the gating circuit 21. In other words, the scanning speed is at or near its upper limit to minimize the chance of losing a signal.

Referring to Fig. 3, the gate pulse and phase shift circuit 27 includes a multivibrator 36 of conventional design comprising a pair of vacuum tubes 37 and 38 which are cross-coupled plate-to-grid through capacitors 39 and 41. The multivibrator 36 is synchronized with the transmitted radio pulses by applying the modulated pulses from the generator 11 through a differentiating circuit 44, 46 and through a coupling capacitor 47 and a coupling resistor 48. The narrow pulse of the multivibrator output wave 42 may be changed in width either by changing the capacity of capacitor 41 and/or by changing the positive bias of the tube 38, this bias being determined by the setting of the tap 43. Changing either the capacity of capacitor 41 or changing said bias changes the timing of the back edge of the narrow pulse of wave 42. In the present example, the said capacity change is employed to obtain the desired cyclic phase or time shift of the gating pulse 26 while the setting of the bias tap 43 is employed to determine the range of distance through which targets will be recorded.

The cyclic phase shift of the gating pulse 26 is obtained by continuosly rotating the rotor plate of the capacitor 41, the rotor plate being mechanically coupled to a shaft 51 driven by the motor 31 (Fig. 1). The capacitor 41 may be a substantially straight-line capacitor, the rotor and stator plates each being substantially semi-circular.

Referring to the wave shaping circuits that shape the rectangular wave 42 into the gating pulse 26, the wave 42 is passed through a differentiating circuit comprising a capacitor 52 and a resistor 53 in series therewith whereby the wave 54 appears across resistor 53. The polarity of the wave 54 is reversed by an amplifier tube 56 which has an un-bypassed resistor 57 in) its cathode circuit to provide some degeneration. The reversed polarity wave, indicated at 58, is applied to the grid of an amplifying and clipping tube 59 that passes only the positive pulse portions of the wave 58. The tops of these positive pulses will be flattened off somewhat as a result of the grid of the tube 59 being driven positive and thereby loading the tube input circuit. These clipped positive pulses appear in the output circuit of the tube 59 as the desired gating pulses 26. The amplitude of the pulses 26 may be adjusted by an adjustable tap 61.

The gating pulse 26 is supplied with negative polarity over the conductor 35 to the grid 62 of a vacuum tube 63 in the gating circuit 21. The tube 63 and a vacuum tube 64 have a common plate circuit and function as described hereinafter to pass the video frequency signal (i. e., the reflected pulses) only while the gate pulse 26 is on the grid 62.

The video frequency pulses are supplied with negative polarity from the video frequency amplifier 19 to the grid 66 of the tube 64. A clipping circuit 18 preferably is provided to remove any noise signals that may be present having a polarity opposite that of the video frequency pulses. In the clipping circuit shown, a diode 67 is connected in a conventional manner for passing only the video frequency pulses which are applied to the cathode of the diode 67 with negative polarity, the positive polarity noise signals having no effect on the diode current and, therefore, being clipped off.

Referring more particularly to the gating circuit 21, the tubes 63 and 64 have positive voltage applied to their anodes through a common anode resistor 65. This anode voltage has a low value compared with the value required for normal amplifier operation. The grids of tubes 63 and 64 are biased positively so that, due to the positive grid bias and low anode voltage, the negative video frequency pulses on the grid 66 of tube 64 will cause only a small change in voltage at the anode end of the anode resistor 65. However, during the time a negative gating pulse 26 is being simultaneously applied to the grid 62 of the tube 63, the video frequency pulses on the grid 66 will cause a large change in the voltage at the anode end of resistor 65. Thus, large amplitude video frequency pulses are obtained at the output circuit of tubes 63 and 64 only during the occurrence of the gating pulse 26 whereby only these larger amplitude signals are passed by an amplifier and clipper tube 71. It should be understood that the invention is not limited to the use of this particular type of gating circuit.

In the example being described, only one of the video frequency pulses (indicated at 72, Fig. 1) will be passed by the gating circuit, provided, of course, that such a pulse is present during the interval that a gating pulse 26 is being applied to the gating circuit. In order to make the group of pulses more effective for operating the recorder, they are applied to the integrating circuit 22 which widens each of the video frequency pulses as indicated at 73, Fig. 1.

The integrating circuit 22 comprises a capacitor 74 connected in series with a diode 76 that is shunted by a resistor 77. Each of the negative video frequency pulses 72 from the amplifier tube 71 causes a pulse of diode current to charge the capacitor 74 quickly, and the charge then leaks off the capacitor 74 comparatively slowly through the resistor 77. Thus, widened video frequency pulses are produced across the resistor 77 and, after being reversed in polarity by an amplifier tube 78, appear as the positive pulses 73 (Fig. 1). The pulses 73 are then applied to the grid 79 of an amplifier tube 81 in the push-pull amplifier 23.

The push-pull amplifier 23 comprises the screen-grid tube 81 and a second screen-grid tube 82. The push-pull circuit is of a well-known type wherein the grid 83 of the tube 82 is held at a fixed potential while its cathode 84 is caused to go more negative when the grid 79 of tube 81 is driven more negative by one of the widened video frequency pulses. The anode circuits of the tubes 81 and 82 include the printer bar driving coils 86 and 87 of the driving unit 25a, the amplified pulses 73 being supplied to the coils 86 and 87 by way of the conductors 88.

Fig. 4 illustrates one suitable design for the driving circuit 5 which maintains synchronism between the pulse transmission and the recorder scanning. Pulses from the pulse generator 11 are impressed upon a frequency divider of the frequency counter type which comprises a pair of diodes 101 and 102 and a small capacitor 103 through which a charging pulse is applied by way of the diode 101 to a comparatively large capacitor 104. The grid circuit of a blocking oscillator 106 is connected across the capacitor 104 so that the oscillator is triggered to produce an output pulse in response to a predetermined voltage being built up across the capacitor 104.

In the present example, the counter divides by seven so that, with 420 pulses per second applied, the resulting pulse rate of the blocking oscillator 106 is 60 pulses per second. The 60 cycle pulses are supplied through a coupling capacitor 107 and an amplitude control resistor 108 to a cathode-coupled multivibrator 109 comprising the vacuum tubes 110 and 111. The resulting 60 cycle square wave is applied over the output leads 112 and 113 in push-pull relation to a push-pull amplifier 114. The amplified square waves are then supplied to the synchronous motor 31 through a transformer 116.

The system of Fig. 1 may be employed as a ground station for recording the approach of aircraft or it may be installed in an airplane for strip mapping of a coast line or the like. In the latter case, the antennas 13 and 14 may be mounted on opposite sides of the aircraft and pointing in opposite directions.

Fig. 6 illustrates the type of record that is obtained with a ground station when the recorder scanning speed is increased to a value at or close to the upper limit without synchronizing the recorder scanning with the pulse transmission. It will be seen that the lines are irregular. The straight lines represent fixed reflecting objects while the curved lines represent aircraft that came within the range of the station. The aircraft indications may be difficult to distinguish from the background of noise signal which is represented by the stippled background in the drawing, there being much less contrast between the noise recording and the aircraft indication in many cases than is shown in Fig. 6. The records of both Fig. 6 and Fig. 7 were made using a single antenna and no antenna switching with the result that the recording on the right is a mirror image of the recording on the left.

Fig. 7 illustrates the type of record that is obtained by practicing the present invention. It will be seen that the fixed objects are represented by clean cut lines. Also, the curved lines representing aircraft are less ragged and more clearly defined than in the example shown in Fig. 6.

The operation of one embodiment of the invention will be explained in more detail with reference to Fig. 5. In this embodiment the recorder scans from zero range to maximum range in 0.176 second instead of scanning in 1 second as in the example given in my above-mentioned copending application. In the example illustrated in Fig. 5, only one reflected pulse may pass through the gate whereas in the example of the copending application, 5.6 pulses may pass through the gate.

Considering the example of Fig. 5 where the recorder scanning is done at the maximum permissible speed for the conditions assumed, it will be seen that with widths of 2 $\mu$s. and 1 $\mu$s. for the received pulse and the gating pulse, respectively, there is coincidence or overlapping of the pulses for 3 $\mu$s. In this example, the gating pulse (which is synchronized with the recorder scanning) is moved through the full range, i. e., from zero time with respect to the pulse transmission to 222 $\mu$s. later than the pulse transmission, in 0.176 second. In this interval of 0.176 second the number of pulses occurring is 0.176 × 420 pulses=74 pulses. The number of pulses occurring during the 3 $\mu$s. that a received pulse and a gating pulse are coincident is $$\frac{3 \ \mu s.}{222 \ \mu s.} \times 74 \ \text{pulses} = 1 \ \text{pulse}$$

Thus the scanning speed of 0.176 second is the correct scanning speed for obtaining a "one pulse" system in the case assumed.

The equation for determining the scanning speed for a system having an 18 mile range (propagation time equals 222 μs.), having a 420 pulse per second pulse rate and having pulse and gate widths of 2 μs. and 1 μs., respectively, may be stated as follows:

$$y \text{ seconds} \times \frac{3 \mu s.}{222 \mu s.} = \frac{1}{420 \text{ pulses}}$$

or $y = 0.176$ second = time for sweeping across the range.

As to the length of time that an echo pulse must remain to be recorded, the example of Fig. 5 gives an improvement of $$\frac{1 \text{ second}}{0.176 \text{ second}}$$

or 5.7 to 1 over the above-mentioned example of the copending application. It is evident that the use of the present invention greatly reduces the possibility of failure to record an echo pulse under conditions of fading due to multiple path reflections or other causes.

Fig. 8 shows the invention applied to a radar system of the frequency modulated type which comprises a radio transmitter 121 that is cyclically frequency modulated by means of a modulator 122 to which is applied a modulating sawtooth wave supplied from a sawtooth wave generator 123. The sawtooth wave generator 123 is driven by pulses from a pulse generator 120. The pulses from generator 120 are also supplied to the driving circuit 5 so that the motor 31 is driven in synchronism with the sawtooth wave modulation.

The frequency modulated radio wave is radiated alternately from the directive antennas 13 and 14 pointing toward the left and toward the right, respectively. The radiated wave, after reflection from a target or other reflecting surface, is picked up by the receiving antenna 15 and supplied to a beat frequency detector 124. Frequency modulated signal is also supplied to the detector 124 directly from the transmitter 121 over a line 126 whereby a beat frequency signal is obtained, the frequency of which is a measure of the distance to the reflecting target.

The beat frequency signal from detector 124 is supplied to an audio frequency amplifier 127 that has a very narrow pass band so that it will pass only the beat frequency signal from one target at a time and supply it to the recorder 24. Means is provided for shifting the said pass band cyclically from the minimum beat frequency to the maximum beat frequency in the operating range. This is done by mechanically coupling the motor 31 to the rotatable arms 128, 129 and 130 of a resistor-capacitor network, this network being frequency selective as described hereinafter in connections with Figs. 10 and 11.

The scanning drum 20 is rotated by the motor 31 in synchronism with the shifting of the band pass characteristic of the amplifier 127. This operation is illustrated in Fig. 9 and corresponds to the scanning drum and gating pulse operation previously described with reference to Fig. 1. It will be seen that the pass band of amplifier 127 is shifted in the direction to pass higher beat frequencies as the contact point of the scanning drum and printer bar moves from the center to the right edge of the paper 30, and then is shifted back in the direction to pass lower beat frequencies as said contact point moves from the left edge of the paper to the center.

Fig. 10 shows merely by way of example one suitable circuit for the amplifier 127. This circuit is described in Terman's Radio Engineers Handbook, page 945. It comprises amplifier tubes 132, 133 and 134 connected to form a direct-current amplifier. A degenerative feed-back connection includes a parallel-T null network, one T section consisting of the capacitors C1 and C2 and the resistor 129a, the other T section consisting of the resistors 128a and 130a and the capacitor C3. The frequency response characteristic of the amplifier is shown in Fig. 11, this characteristic being due to the fact that at the null frequency there is no degenerative feedback and the amplifier operates at full gain. It will be apparent that the mid-frequency of the response curve may be shifted by rotating the resistor arms 128, 129 and 130 to obtain the desired gating operation whereby a record of the type previously described is obtained.

Just as in the pulse-echo embodiment of the invention, the recorder scanning speed, the gate width, etc. are selected to obtain a system that passes substantially the minimum required signal through the gate. The synchronization of frequency modulation and recorder scanning insures maximum legibility of the recorded signal.

In the drawing, various circuit values have been indicated, merely by way of example, in ohms, thousands of ohms and megohms, and in microfarads and micro-microfarads.

I claim as my invention:

1. In combination, a radar system comprising means for radiating a periodically modulated radio wave to a reflecting object and means for receiving said wave after reflection from said object, gating means for making said receiving means pass only the waves reflected from an object a predetermined distance from said radar system, recording apparatus for recording the waves passed by said receiving means, said recording apparatus including means for scanning a recording surface by an effective recording contact point which is actuated by the waves passed by said receiving means, means for operating said gating means and said recorder scanning means in synchronism, and means for maintaining said scanning means in synchronism with said periodic modulation.

2. In combination, a pulse-echo radar system comprising means for radiating toward a reflecting object a radio pulse that recurs at a certain periodic rate and means for receiving said pulse after reflection from said object, means for producing a gating pulse that recurs at said periodic rate and which is adjustable in timing with respect to the radiated pulse, means for applying said gating pulse to said receiving means so that it passes only the reflected pulses that are received during the occurrence of the gating pulse, recording apparatus comprising scanning means for moving an effective recording contact point along a recording surface, means for actuating said recording contact by the waves passed by said receiving means, means for shifting in synchronism said timing of the gating pulse and said movement of the recording contact point, and means for synchronizing the movement of said recording contact point with the radiation of said periodic radio pulses.

3. The invention according to claim 2 wherein the recorder scanning speed and the gate pulse width are such that the number of pulses per recorder scan supplied to the recorder from a reflecting object does not exceed two.

4. The invention according to claim 2 wherein the recorder scanning speed and the gate pulse width are such that only one pulse per recorder scan is supplied to the recorder from a reflecting object.

5. In combination, a pulse-echo radar system comprising means for radiating toward a reflecting object a radio pulse that recurs at a certain periodic rate and means for receiving said pulse after reflection from said object, means for producing a gating pulse that recurs at said periodic rate and which is adjustable in timing with respect to the radiated pulse, means for applying said gating pulse to said receiving means so that it passes only the reflected pulses that are received during the occurrence of the gating pulse, recording apparatus comprising scanning means for moving an effective recording contact point along a recording surface, means for actuating said recording contact by the waves passed by said receiving means, means for gradually increasing the time interval between the radiated pulse and the gating pulse while said recording contact point is being moved from the center of the recording surface to one edge thereof, means for gradually decreasing said time interval while said contact point is being moved from the other edge of the recording surface to said center, and means for synchronizing the movement of said contact point with the radiation of said periodic radio pulses.

6. The invention according to claim 5 wherein the recorder scanning speed and the gate pulse width are such that the number of pulses per recorder scan supplied to the recorder from a reflecting object does not exceed two.

7. The invention according to claim 5 wherein the recorder scanning speed and the gate pulse width are such that only one pulse per recorder scan is supplied to the recorder from a reflecting object.

8. A radio locator system comprising means for transmitting toward a reflecting object a frequency modulated radio wave that is cyclically modulated at a certain rate, a radio receiver including a beat frequency detector for receiving the wave reflected from said object, means for supplying frequency modulated signal directly from said transmitting means to said detector, an audio frequency amplifier having a narrow frequency pass band, means for supplying the output of said detector to said amplifier, means for shifting said pass band at a slow rate compared with said cyclic modulation for making said receiver pass successively only the received waves that are reflected from objects located at predetermined distances from said system, a recorder comprising means for scanning a recording surface at said slow rate by a recording contact point, means for causing said recorder to make a mark on said surface at the position of said contact point in response to signal passed by said amplifier, means for synchronizing said recorder scanning with the shifting of said pass band, and means for synchronizing said recorder scanning with said cyclic modulation of the frequency modulated wave.

JOHN P. SMITH.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 2,326,880 | Norrman | Aug. 17, 1943 |
| 2,415,981 | Wolff | Feb. 18, 1947 |
| 2,422,334 | Bedford | June 17, 1947 |
| 2,475,598 | Eltz | July 12, 1949 |
| 2,492,120 | Smith | Dec. 20, 1949 |